(12) United States Patent
Salisbury

(10) Patent No.: US 7,212,637 B2
(45) Date of Patent: May 1, 2007

(54) CARTRIDGE VALIDATION WITH RADIO FREQUENCY IDENTIFICATION

(75) Inventor: Phillip C. Salisbury, Golden Valley, MN (US)

(73) Assignee: Rimage Corporation, Minneapolis, MN (US)

( * ) Notice: Subject to any disclaimer, the term of this patent is extended or adjusted under 35 U.S.C. 154(b) by 731 days.

(21) Appl. No.: 10/385,773

(22) Filed: Mar. 11, 2003

(65) Prior Publication Data

US 2004/0181681 A1 Sep. 16, 2004

(51) Int. Cl.
*H04K 1/00* (2006.01)
*H04L 9/32* (2006.01)

(52) U.S. Cl. .......................... 380/270; 380/51
(58) Field of Classification Search ................ 713/170; 380/270, 51
See application file for complete search history.

(56) References Cited

U.S. PATENT DOCUMENTS

| | | | |
|---|---|---|---|
| 5,940,854 A | * | 8/1999 | Green et al. ................. 711/112 |
| 6,362,893 B1 | | 3/2002 | Francis |
| 6,367,010 B1 | * | 4/2002 | Venkatram et al. .......... 713/171 |
| 6,386,772 B1 | | 5/2002 | Klinefelter |
| 6,412,991 B1 | | 7/2002 | Klinefelter |
| 2003/0059050 A1 | * | 3/2003 | Hohberger et al. ........... 380/270 |

* cited by examiner

*Primary Examiner*—Gilberto Barrón, Jr.
*Assistant Examiner*—Andrew L. Nalven
(74) *Attorney, Agent, or Firm*—Leffert Jay & Polglaze, P.A.

(57) ABSTRACT

Validation of printer cartridges using a unique identifier from an RFID tag, a serial number or identifier from a cartridge, and a seed to generate a reproducible key are described. The key is written to non-volatile memory of the RFID tag. The parameters for generation of the key are retrieved when the cartridge is asked to print in a printer, and a second key is generated, and the keys are compared. If the keys match, the cartridge is validated and printing continues.

18 Claims, 2 Drawing Sheets

CARTRIDGE VALIDATION WITH RADIO FREQUENCY IDENTIFICATION

FIELD

The present invention relates generally to printer cartridges and in particular the present invention relates to validation of printer cartridges in a printer.

BACKGROUND

Print cartridges for printers are typically single use commodities. Each cartridge contains a supply of ink, for example in an ink jet type printer. Once the ink supply is exhausted, the cartridge is discarded or recycled, and a new cartridge is loaded into the printer. Many cartridges are not designed to be refilled, or to be replaced with non-printer specific cartridges. Print cartridges contain a memory among other components. The memory may contain parameters corresponding to various physical characteristics of the cartridge, including by way of example only and not by way of limitation ink type, ink color, ink quantity, date codes for manufacture of cartridge and ink, cartridge serial number or identifier, and the like.

Radio frequency identification (RFID) operates on well known principles. The requirements for a simple RFID system include an antenna or coil, a transceiver, and a transponder. The transceiver generates signals which are emitted by the antenna as radio signals. In some RFID systems, the transceiver and antenna are combined with a decoder and called an interrogator. The radio signals excite or activate an RFID tag containing the passive transponder. The tag transponder emits a signal in response to the received radio signals. This response is received and interpreted by the transceiver/decoder. RFID tags can contain a relatively large amount of data stored in on-tag non-volatile memory. Many passive RFID tags are programmed only once with data, and are not re-programmable. Some RFID tags carry a non-volatile memory that can be programmed, such as a flash memory, an electrically erasable programmable read-only memory (EEPROM), or the like. Active RFID tags have an internal power source, and are typically read/write capable.

In many areas, validation of print cartridges is important. For example, in a printer in which a certain type of cartridge or quality of cartridge is required, or in which an authentic cartridge specifically designed for the printer is required, the large number of cartridges available that all have the same basic configuration could result in an incorrect, improper, or non-authentic cartridge being used in a printer, potentially damaging not only the cartridge, but the printer and perhaps any media on which the printer is used. Simple validation techniques such as detecting a correct size or ink configuration of an ink cartridge are already performed on some printers using the information stored in the memory of the print cartridge. However, since such information is relatively standard and known, compromising the simple validation techniques currently used is not a complex process.

For the reasons stated above, and for other reasons stated below which will become apparent to those skilled in the art upon reading and understanding the present specification, there is a need in the art for a validation system more resistant to compromise.

SUMMARY

The above-mentioned problems with printer cartridge validation and other problems are addressed by the present invention and will be understood by reading and studying the following specification.

In one embodiment, a method of validating an ink cartridge in a printer includes creating a key matching the cartridge and the printer, verifying the key when the cartridge is placed in the printer, and allowing operation of the cartridge in the printer when the key is verified.

In another embodiment, a method of encrypting an ink cartridge with an RFID tag includes retrieving a serial number from the cartridge, retrieving a unique identifier (UID) from the RFID tag, combining the serial number and the UID with a seed to form a key, and writing the key to non-volatile memory of the RFID tag.

In yet another embodiment, an ink cartridge includes an ink reservoir, a printhead, a cartridge memory having a cartridge serial number, and a radio frequency identification tag. The RFID tag has a key encrypted on it, the key generated from a unique identifier for the RFID tag and a serial number for the cartridge.

In still another embodiment, a print system includes a printer having memory, a print controller, a print tray, and a printing mechanism, and at least one ink cartridge. Each ink cartridge includes an ink reservoir, a printhead, a cartridge memory having a cartridge serial number, and a radio frequency identification tag, the tag having encrypted thereon a key comprising a unique identifier for the RFID tag and a serial number for the cartridge.

In yet another embodiment, a method of validating a cartridge from a known key includes retrieving the known key from a cartridge RFID tag, retrieving an RFID tag unique identifier, retrieving a cartridge serial number, and generating a second key. The second key is then compared to the known key to validate the cartridge if the keys match.

In still yet another embodiment, a method of operating a print system includes generating a first key from parameters of a print cartridge, storing the first key in a radio frequency identification tag attached to the print cartridge, placing the print cartridge into the print system, interrogating the RFID tag for the first key, generating a second key from parameters of the print cartridge and the first key, and allowing printing when the second key and the first key are the same.

Other embodiments are described and claimed.

DETAILED DESCRIPTION

Figure 1:
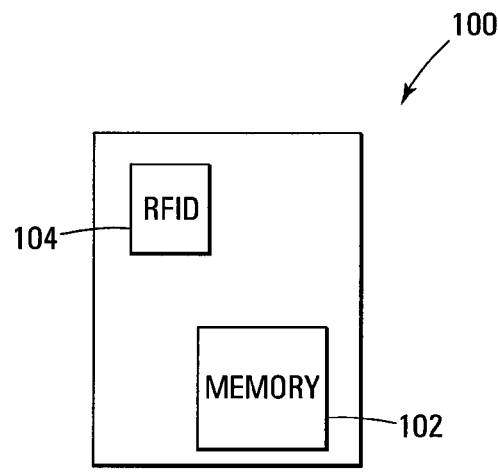
FIG. 1 is a block diagram of a print cartridge according to one embodiment of the present invention.

In the following detailed description of the invention, reference is made to the accompanying drawings that form a part hereof, and in which is shown, by way of illustration, specific embodiments in which the invention may be prac ticed. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The following detailed description is, therefore, not to be taken in a limiting sense, and the scope of the present invention is defined only by the appended claims, along with the full scope of equivalents to which such claims are entitled.

The ink cartridge validation embodiments of the present invention include a system used to ensure the validity of ink cartridges installed in a printer at print-time, and methods for the validation and programming thereof. Each print cartridge has a Radio Frequency IDentification (RFID) tag applied to it, the tag containing an electronically readable and globally unique serial number (UID) plus some amount of read/write non-volatile memory.

During cartridge packaging, a parameter from the cartridge, such as a serial number or other identifier is combined with the tag UID and other parameters (including a random or pseudo-random seed for encryption) through a proprietary mathematical function. Encryption algorithms, methods, and processes are well known in the art, and it should be understood that any encryption method or algorithm that is capable of providing a key with an extractable seed is amenable to use with the methods and apparatuses of the embodiments of the present invention. The resultant key is stored in the tag's non-volatile memory, and is accessible to a control program or the like. When a print operation is initiated, the controlling software for the printer, the printer controller, retrieves the information of the combined result in the non-volatile memory of the tag, and checks the cartridge parameter and the tag UID to ensure that a valid cartridge is present before printing.

FIG. 1 is a block diagram of a print cartridge 100 according to one embodiment of the present invention. Cartridge 100 comprises in one embodiment a memory 102, an attached RFID tag 104, a printhead and an ink reservoir (not shown). The cartridge memory 102 contains a portion of non-volatile memory in which is stored information concerning the cartridge 100. Each printer cartridge has an identifier or serial number, typically stored in cartridge memory, and other information, for example, date codes, ink type and color, cartridge usage information, and the like. The cartridge memory in one embodiment is a memory capable of storage and writing of non-volatile data, such as a flash memory, an EEPROM, or the like. As has been mentioned above, the RFID tag has a portion of non-volatile memory. In other embodiments, an identifier is an intrinsic property of the cartridge, such as element resistance or another measurable property. In another embodiment, memory is a permanently programmed set of fuses or other links, such as in a fuse bank or the like, and is a property of the fabrication of the cartridge or integrated circuit within the cartridge.

In one embodiment, when a key such as that described above has been generated from the UID of the RFID tag and the serial number or identifier for the print cartridge, the key is stored in non-volatile memory of the RFID tag. When the cartridge is loaded into a printer, the print controller for the printer retrieves the key, retrieves the UID from the RFID tag, retrieves the serial number or identifier from the cartridge, extracts the seed from the key, and re-generates the key using the seed extracted from the key. The print controller compares the retrieved key and the re-generated key, and if the two keys match, the print controller allows the cartridge to be used in the printer.

An RFID tag is attached to each cartridge. The RFID tag has its own UID. The printer controller reads the serial number or identifier of the cartridge, and stores it in a memory or temporary buffer or the like, and reads the UID for the RFID tag, also storing it in memory or a temporary buffer. The controller or controlling software obtains a random or pseudo-random seed from a personal computer or the like that is used to encrypt the cartridge serial number or identifier with the UID of the RFID tag and the seed to form a key. This key, containing the seed in an extractable format, is written to the RFID tag non-volatile memory.

When the cartridge is placed in a printer, the printer controller or driver reads the key, extracts the seed, extracts the RFID UID and the serial number or identifier for the print cartridge, and encrypts the seed, UID, and cartridge serial number or identifier. The controller or driver compares the retrieved key and the newly generated key. If they match, the controller allows the print cartridge to be used. If the retrieved key and the newly generated key do not match, then the print cartridge is not allowed to operate with the printer.

Figure 2:
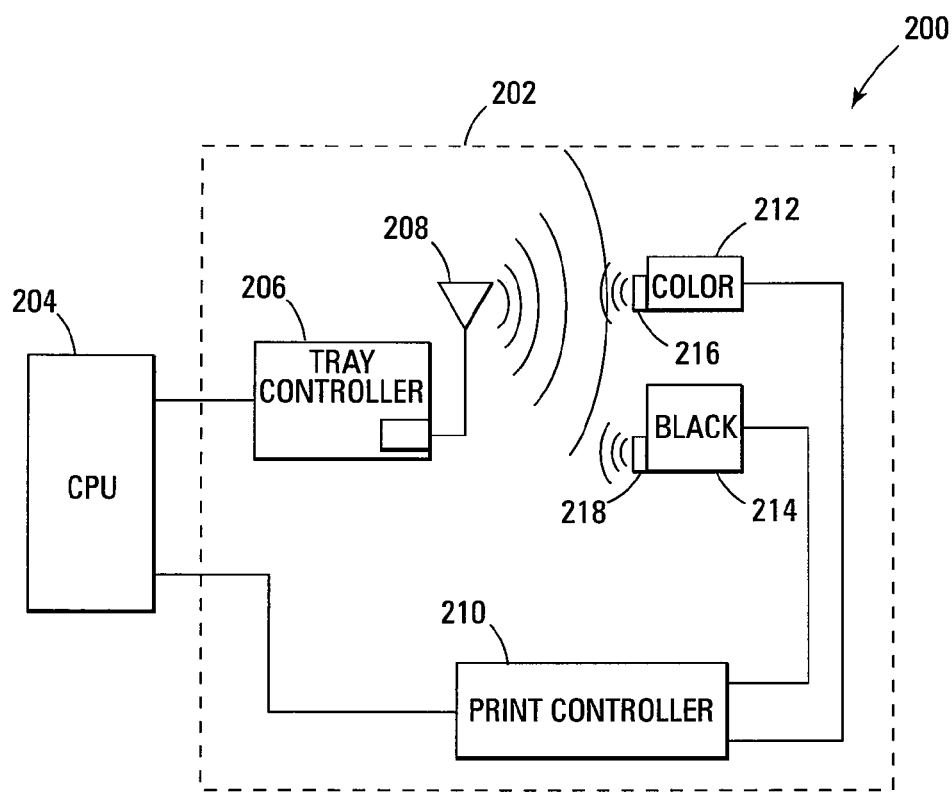
FIG. 2 is a block diagram of a system according to another embodiment of the present invention.

In the embodiments of the present invention, a cartridge is matched to an RFID tag, and the printer in which the cartridge is to be used verifies that the cartridge is proper before allowing the cartridge to work. This prevents counterfeiting of cartridges, and increases security for the use of cartridges. The validation embodiments of the present invention FIG. 2 is a block diagram of a system 200 according to one embodiment of the present invention. System 200 comprises in one embodiment a printer 202 connected to a computer or processor 204. The printer comprises a tray controller 206 having an antenna and transceiver 208. The tray controller 206 also contains a decoder for the antenna/transceiver. A print controller 210 is connectable between the computer 204 and at least one print cartridge 212, 214 such as cartridge 100 described above. Each cartridge 212, 214 has an associated RFID tag 216, 218 attached thereto, and programmable to contain the key information described herein. In one embodiment, cartridge 212 is a color ink jet print cartridge, and cartridge 214 is a black ink jet print cartridge.

In operation in a printer, the antenna/transceiver 208, under control from the tray controller 206, emits a radio frequency signal in the antenna area. The cartridge tags 216 and 218, in the antenna range, receive the emitted radio waves and are activated to transmit the information that has been polled by the transceiver/antenna 208. This information includes in one embodiment a key that is used to verify that the RFID tag of the print cartridge is correctly matched with the cartridge. The verification process is shown in greater detail in FIG. 3.

Figures 3, 4:
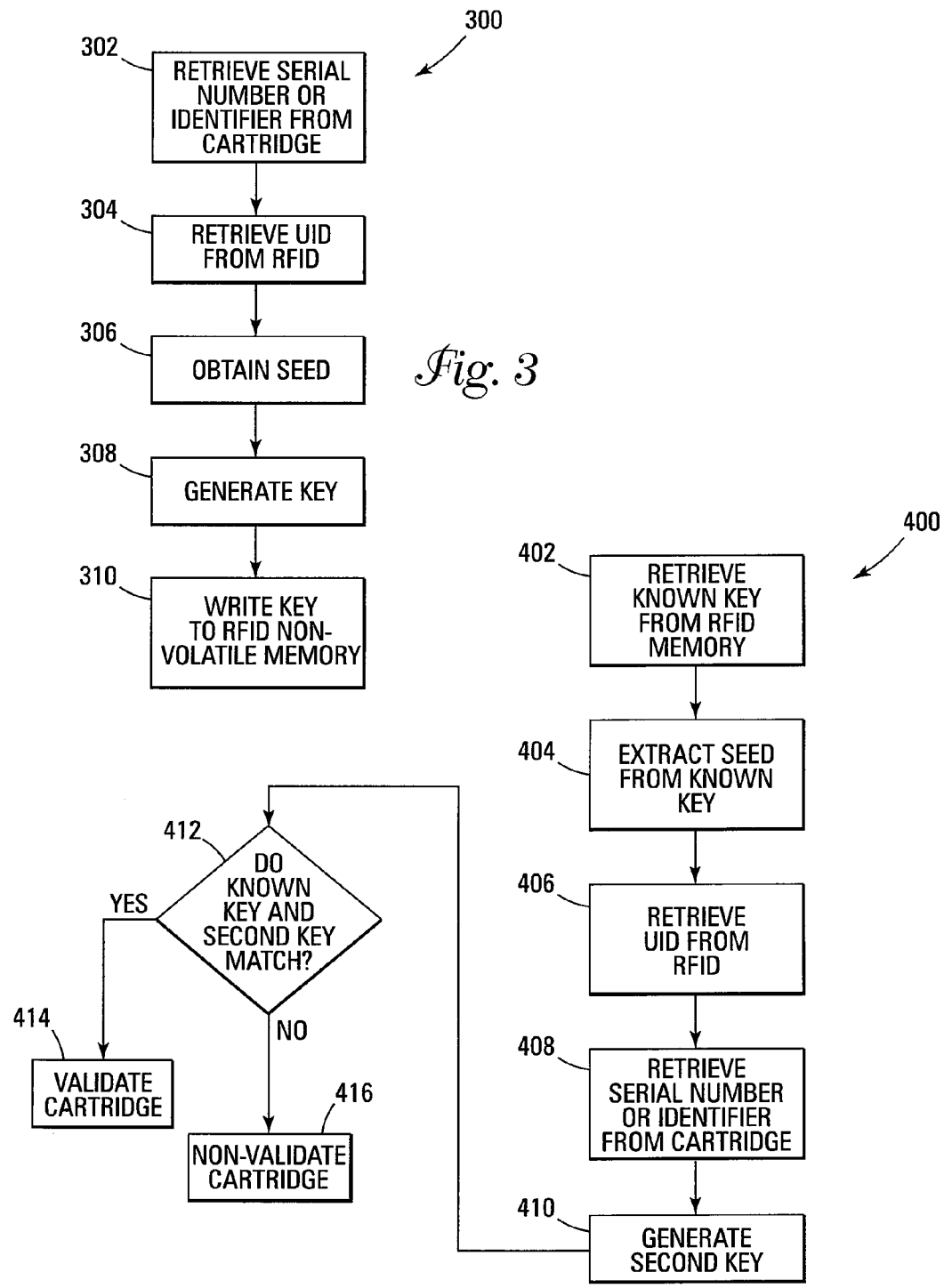
FIG. 3 is a flow chart diagram of a method according to another embodiment of the present invention.
FIG. 4 is a flow chart diagram of a method according to another embodiment of the present invention.

FIG. 3 is a flow chart diagram of a method 300 for programming a key into an RFID tag attached to a print cartridge. Method 300 comprises retrieving a serial number or identifier for the cartridge in block 302, retrieving a unique identification (UID) from the RFID tag in block 304, obtaining a seed for encryption in block 306, generating a key in block 308, and writing the generated key to RFID non-volatile memory in block 310. Generating the key comprises in one embodiment encrypting the serial number, UID, and seed in such a manner as to allow the seed to be later retrieved from the key.

FIG. 4 is a flow chart diagram of a method 400 for validating a cartridge with an attached RFID tag containing a key written to its non-volatile memory. Method 400 comprises retrieving a known key from the RFID non-volatile memory in block 402, extracting a seed from the known key in block 404, retrieving the UID from the RFID tag in block 306, retrieving the serial number or identifier from the cartridge in block 308, and generating a second key from the seed, the UID, and the cartridge serial number or identifier in block 310. The second key is generated using the same encryption algorithm, process, or method as the generation of the known key, so that if the seed, UID, and serial number or identifier are the same for each key generation, the keys will match. Once the second key has been generated, the second key is compared to the known key in comparison block 312. If the known key matches the second key, the cartridge is validated in block 314. If the known key does not match the second key, the cartridge is non-validated in block 316.

In operation, the driver retrieves a cartridge serial number from the cartridge. This serial number, along with a unique identification number (UID) from the RFID tag, are encrypted into a key using some sort of random or pseudo-random seed. The resulting key allows a controller such as a print controller to retrieve the seed from the key. The print controller then retrieves the UID and the cartridge serial number, and using the seed, re-creates the key through the same encryption process. The keys are compared, and if they match, the correct printer cartridge and RFID tag are matched, and the printer is allowed to print. If the keys do not match, the print cartridge is not valid, and will not print.

In one embodiment, the RFID tags used are ISO 15693 RFID tags, manufactured by Texas Instruments which are capable of discrimination of multiple cartridges in an antenna field simultaneously.

While a printer having two ink cartridges is shown, it should be understood that the embodiments of the present invention are amenable to use with a single cartridge printer. Further, if the printer is a laser printer or the like, a replaceable toner cartridge having a serial number or other identifier could be combined with an RFID tag as described above without departing from the scope of the present invention.

In one embodiment, the computer has stored thereon a driver that is capable of controlling and operating the retrieval and checking of the RFID and print cartridge information. Such a driver includes machine readable instructions for performing the checks required to validate the cartridge(s) in a printer using the methods described in further detail above.

The methods shown in the Figures may be implemented in whole or in part in various embodiments in a machine readable medium comprising machine readable instructions for causing a computer or processor such as is shown in FIG. 2 to perform the methods. The computer programs run on a central processing unit out of main memory, and may be transferred to main memory from permanent storage via disk drive or CD-ROM drive when stored on removable media or via a network connection or modem connection when stored outside of the computer, or via other types of computer or machine readable media from which it can be read and utilized.

Such machine readable media may include software modules and computer programs. The computer programs may comprise multiple modules or objects to perform the methods in Figures or the functions of various apparatuses of Figures. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

CONCLUSION

Methods and apparatus for validation of printer cartridges have been described that include using a unique identifier from an RFID tag, a serial number or identifier from a cartridge, and a seed to generate a reproducible key. The key is written to non-volatile memory of the RFID tag. The parameters for generation of the key are retrieved when the cartridge is asked to print in a printer, and a second key is generated. If the keys match, the cartridge is validated and printing continues.

Advantages of the embodiments of the present invention include but are not limited to allowing the system to store various operational parameters in the non-volatile memory, and associating an intrinsic variable property of the cartridge with a unique identification number in the tag, which provides a validation system more resistant to compromise.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of validating an ink cartridge in a printer, comprising:
creating a key matching the cartridge and the printer;
verifying the key when the cartridge is placed in the printer; and
allowing operation of the cartridge in the printer when the key is verified, wherein creating the key comprises:
retrieving a serial number from the cartridge;
retrieving a unique identifier (UID) from a cartridge RFID tag; and
combining the serial number and the UID with a seed.

2. The method of claim 1, wherein verifying the key comprises:
retrieving the key from a cartridge RFID tag;
retrieving an RFID tag unique identifier;
retrieving a cartridge serial number;
generating a second key; and
comparing the second key to the key.

3. A method of encrypting an RFID tag on an ink cartridge, comprising:
retrieving a serial number from the cartridge;
retrieving a unique identifier (UID) from the RFID tag;
combining the serial number and the UJD with a seed to form a key;
writing the key to non-volatile memory of the RFID tag.

4. The method of claim 3, wherein combining further comprises encrypting the key so that the seed is extractable from the key.

5. An ink cartridge, comprising:
an ink reservoir;
a printhead;
a cartridge memory having a cartridge serial number; and
a radio frequency identification tag, the tag having encrypted thereon a key comprising a unique identifier for the REID tag and a serial number for the cartridge.

6. The ink cartridge of claim 5, wherein the key is encrypted using a random seed, and is stored in non-volatile memory of the RFID tag.

7. The ink cartridge of claim 5, wherein the REID tag is an ISO 15593 tag.

8. The ink cartridge of claim 5, wherein the ink cartridge is an ink jet print cartridge.

9. A print system, comprising:
a printer having memory, a print controller, a print tray, and a printing mechanism; and
at least one ink cartridge, each ink cartridge comprising:
an ink reservoir;
a printhead;
a cartridge memory having a cartridge serial number; and
a radio frequency identification (RFID) tag, the tag having encrypted thereon a key comprising a unique identifier for the RFID tag and a serial number for the cartridge.

10. The print system of claim 9, wherein the REID tag is an ISO 15593 tag.

11. The print system of claim 9, wherein the print cartridge is an ink jet print cartridge.

12. A machine readable medium for causing a processor to perform a method, comprising:
creating a key matching the cartridge and the printer:
verifying the key when the cartridge is placed in the printer: and
allowing operation of the cartridge in the printer when the key is verified, wherein creating the key comprises:
retrieving a serial number from the cartridge;
retrieving a unique identifier (UID) from a cartridge REID tag; and combining the serial number and the UID with a seed.

13. The machine readable medium of claim 12, wherein verifying the key comprises:
retrieving the key from a cartridge REID tag;
retrieving an REID tag unique identifier;
retrieving a cartridge serial number;
generating a second key; and
comparing the second key to the key.

14. A method of validating a cartridge using from a known key, comprising:
retrieving the known key from a cartridge REID tag;
retrieving an REID tag unique identifier;
retrieving a cartridge serial number;
generating a second key; and
comparing the second key to the known key.

15. The method of claim 14, wherein generating a second key comprises:
retrieving a seed from the known key; and
combining the REID tag unique identifier, the cartridge serial number, and the retrieved seed.

16. A method of operating a print system, comprising:
generating a first key from parameters of a print cartridge;
storing the first key in a radio frequency identification tag attached to the print cartridge;
placing the print cartridge into the print system;
interrogating the RFID tag for the first key;
generating a second key from parameters of the print cartridge and the first key; and
allowing printing when the second key and the first key are the same.

17. The method of claim 16, wherein generating the first key comprises:
retrieving a serial number from the print cartridge;
retrieving a unique identifier (UID) from the RFID tag; and
combining the serial number and the UID with a seed.

18. The method of claim 16, wherein generating a second key comprises:
retrieving the known key from a cartridge RFID tag;
retrieving an RFID tag unique identifier;
retrieving a cartridge serial number;
generating a second key; and
comparing the second key to the key.

* * * * *